United States Patent [19]

Stiehl et al.

[11] 4,197,098
[45] Apr. 8, 1980

[54] FILTER BYPASS MEASUREMENT SECTION

[75] Inventors: Hans H. Stiehl; Gerhard M. Neumann, both of Berlin, Fed. Rep. of Germany

[73] Assignee: Delbag-Luftfilter GmbH, Fed. Rep. of Germany

[21] Appl. No.: 762,389

[22] Filed: Jan. 26, 1977

[30] Foreign Application Priority Data

Jan. 27, 1976 [DE] Fed. Rep. of Germany ... 7602442[U]

[51] Int. Cl.² .................... B01D 53/30; B01D 46/30
[52] U.S. Cl. .................................... 55/270; 55/274;
55/314; 55/350; 55/480; 55/484; 55/502;
55/503; 55/507; 55/513; 55/518; 55/DIG. 9;
73/421.4 R
[58] Field of Search ............... 55/270, 274, 275, 312,
55/314, 428, 350, 356, 484, 502, 503, 507, 513,
518, DIG. 9, 481, 418, 480, 485; 73/38, 421.5 R

[56] References Cited

U.S. PATENT DOCUMENTS

| 964,719 | 7/1910 | Wegescheidt | 55/274 |
| 2,579,477 | 12/1951 | Dauphinee | 55/270 |
| 3,056,499 | 10/1962 | Liddell | 210/108 |
| 3,263,704 | 8/1966 | Boisjoly | 55/503 |
| 3,310,322 | 3/1967 | Carroll | 55/503 |
| 3,490,205 | 1/1970 | Hauser | 55/418 |
| 3,690,045 | 9/1972 | Neumann | 55/481 |
| 3,961,921 | 6/1976 | Gilbert | 55/270 |

FOREIGN PATENT DOCUMENTS 1091415 10/1960 Fed. Rep. of Germany ............. 55/481

Primary Examiner—Frank W. Lutter
Assistant Examiner—David L. Lacey
Attorney, Agent, or Firm—Basile and Weintraub

[57] ABSTRACT

A damping tube-shaped bypass measurement section with protective maintenance features and continuous flow velocity scanning on absorptive filtration units in the nuclear engineering field is disclosed. The bypass measurement section comprises a tube-shaped bypass measurement section, having single or double elements, for absorption filters, featuring at least one shut-off device, and including an absorption layer thickness connected to the main filtration unit which is to be controlled or monitored, and provides for an equivalent absorption layer thickness.

8 Claims, 13 Drawing Figures

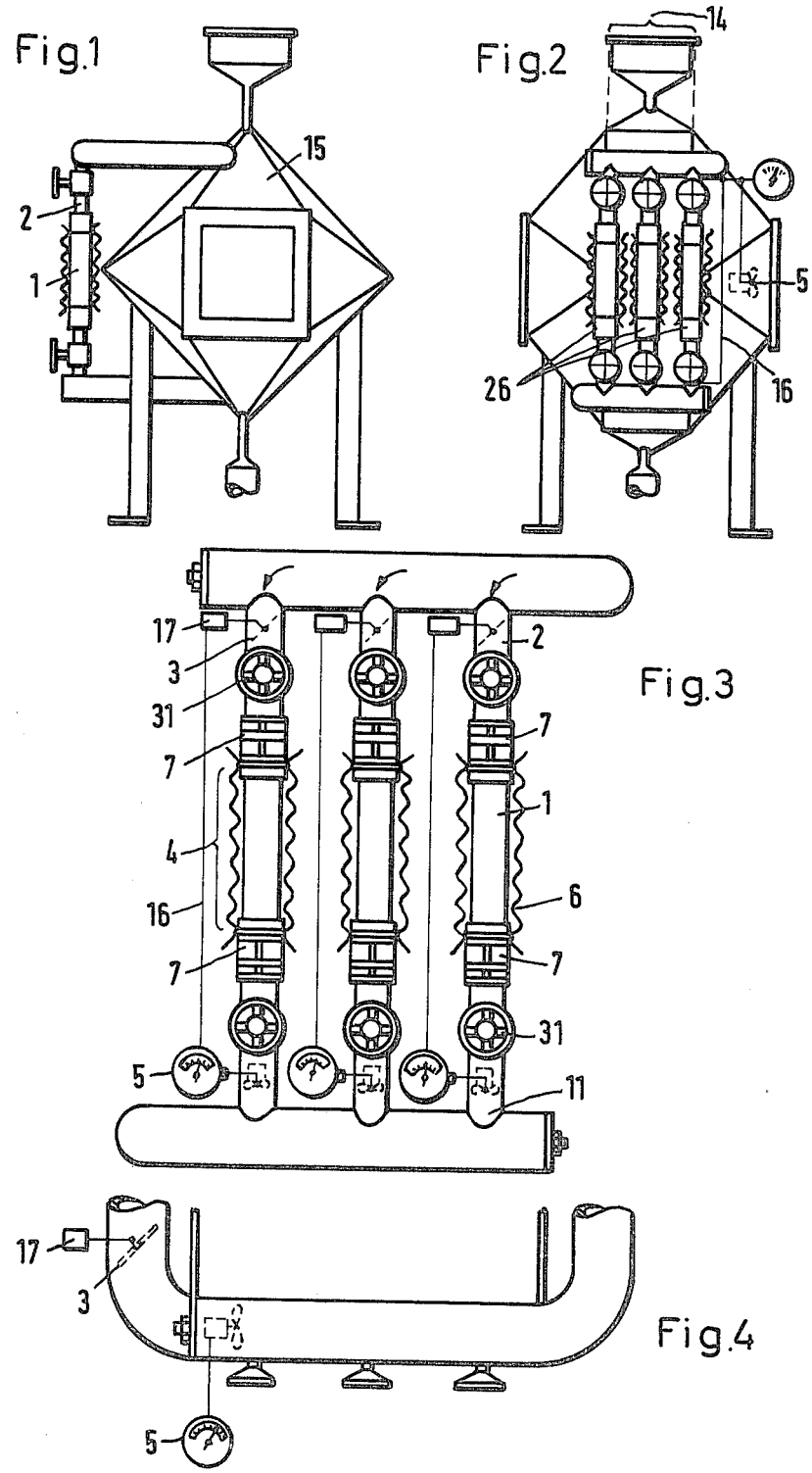

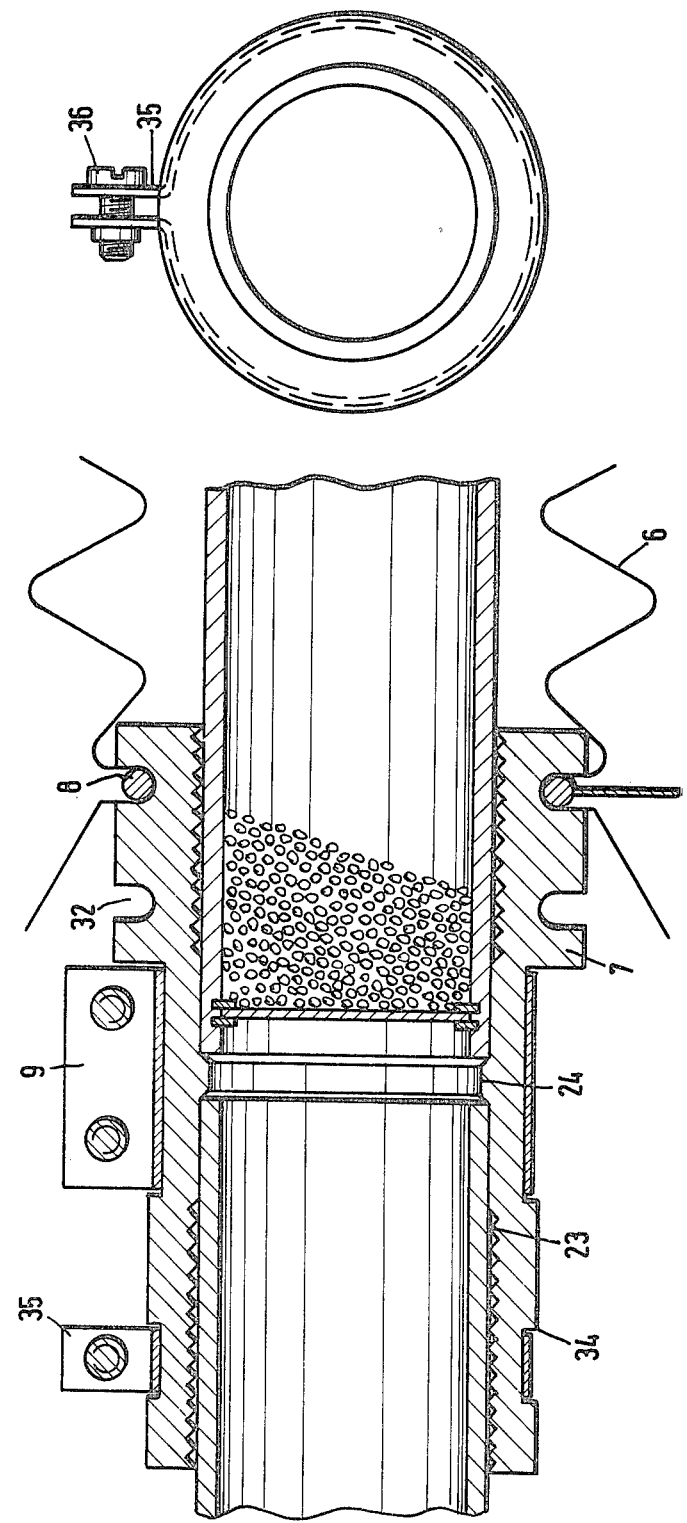

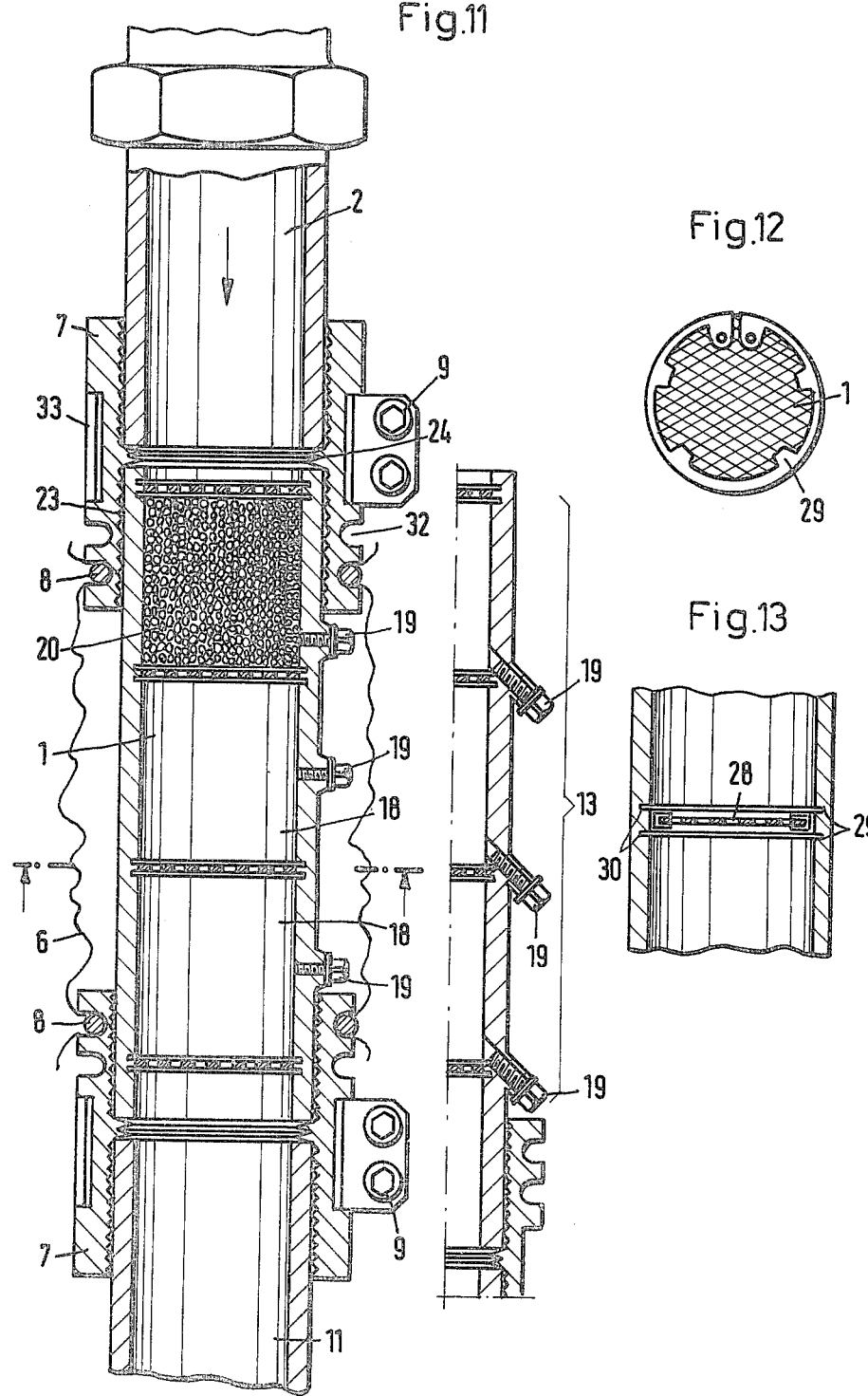
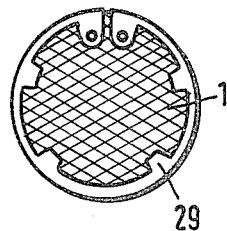
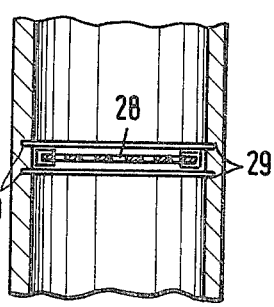

FILTER BYPASS MEASUREMENT SECTION

BACKGROUND OF THE INVENTION

I. Field of the Invention

The present invention relates to measurement systems and, in particular, to a tube-shaped bypass measurement section of absorption filters.

II. Description of the Prior Art

In activated carbon filtration units, it is desirable to examine the absorption level and the degree of saturation of the absorbent which is used in the filtration unit. This is done from time to time and without interrupting the function of the main carbon filtration units. Such requirements are especially important in nuclear engineering units.

The useful life of such activated charcoal filtration units depends on the amount of radioactive contaminants and other contaminants carried by the air to be filtered. If the concentration is high, the absorbent used (e.g. activated charcoal) must be replaced in time prior to exceeding the permissible limit with fresh absorbent. To determine the time for replacement in optimal fashion, bypass measurement sections are installed parallel to the main active charcoal absorption units. A partial airstream is diverted through the bypass section which features identical layer thickness and packing density. Samples are removed from the bypass section for examination. In this manner data is obtained concerning the status of separation efficiency and saturation of the absorbent in the main filtration unit.

The present state of the art, e.g. West German Pat. Nos. Gbm 712 66 75 and Gbm 741 72 94, exhibit the familiar tube-like filtration cartridges. These cartridges are charged with an absorbent that is the same as that employed by the activated carbon filtration unit, and the cartridge also has an absorbent layer thickness which is the same as the activated carbon filtration unit which is to be monitored. Such bypass measuring sections, or control filter sections, which generally bypass the main filtration unit in a parallel arrangement, usually are installed between the feed side and the discharge side.

The best known systems, represented by such bilaterally lockable bypass measuring sections, differ only with respect to the method of installation. Individual cartridges are either connected by means of gas-tight flanges or by screw pipe couplings; in either case, the layer thickness may be subdivided in several chambers. In some cases the test cartridges may even be exchanged, or removed, without disassembling the complete bypass section.

The bypass designs presently known to the art, mostly single or double sections, are not function specific; rather their design is governed by parameters requiring a special shape or necessary compliance with given installation needs, e.g. the avoidance of bulky components, such as ball valves or quarter bends, etc.

The inherent deficiencies of such devices have indeed been recognized but have heretofore not been remedied. In practical terms, given the presence of dangerous levels of radioactivity, during removal of the test cartridges from the measurement section, contamination by or dispersion of radioactive materials occurs. Controlled handling by means of adequate maintenance protection devices was heretofore not achievable, or only incompletely so, due to the lack of respective technical features.

A further disadvantage is inherent in designing the absorbent layer thickness in the bypass test cartridges in conformity with the bulk absorbent layer thickness of the main unit. It has been found that this is wrong. Because of the different packing density of the absorbent in the main filtration unit and in the test cartridge, the airflow velocities frequently are different. This results in wrong measurements with respect to saturation level and degree of separation as achieved by the activated charcoal in the test cartridges of the bypass sections.

A further disadvantage, which became recognized, is the absence of damper flaps and measurement devices which take readings directly at the bypass sections. Such devices allow for control of flow-through velocities of the air and make it possible to adjust these velocities to the respective values prevailing in the main absorption unit. A further disadvantage in the existing designs was the necessity of taking the total bypass section out of service, even if only one of the chambered sections needed to be recharged.

SUMMARY OF THE INVENTION

It is therefore an objective of our new design to avoid the listed disadvantages and to provide for a bypass section which is controllable, is subdivided in chambers, and features the necessary maintenance protection devices, as well as separate removal capabilities, and in general incorporates the latest knowledge available in this field. Among such features are, to start with, the requisite maintenance protection devices for transporting the bypass section, as well as requisite devices needed during sample removal, and also the capability of providing for a gas-tight sealing at the ends of the tube section.

A further innovation consists of monitoring the measurement section and the capability of adjusting to the flow-through velocity of the air in line with the main bulk absorption unit. This is achieved by instrumentation reading directly at the bypass section and by manually, or automatically, actuated damper devices which allow control and setting to proper flow-through velocity.

The innovation furthermore allows for a significantly smaller measurement section. This is possible by a proportional reduction of the layer thickness in the measurement section, corresponding to the different packing density and flow conditions of up to a maximum of 30%. At the same time better measurement results are obtained.

In accordance with the novel design, a multichambered measurement cartridge with separate individual discharge facilities is provided. The cartridge is furthermore covered by a transparent protection, or maintenance tube, and pressure coupled by means of bilaterally movable, grooved, sleeve joints made of rubber or plastic to provide a tight seal with the pipe section. Such an arrangement has the advantage that the measurement cartridge, in its protective sleeve, can be bilaterally sealed off prior to removal. The protective pouch maintenance technique of the nuclear engineering field can be considered as familiar and established in this respect.

To monitor and control the airflow velocity in the measurement section, the novel design contributes the following solutions: at the supply side of the bypass measurement section a manually or automatically controllable damping device is installed; after the bypass cartridge in the exit airstream section an air velocity measurement device, such as a turbine blade anemometer or a thermal anemometer, is installed. For the case that the flow resistance characteristics of the measurement and control section deviate positively or negatively from the pressure drop in the absorption unit, the damping device is either manually or, by a feedback loop, automatically reset to conform with the respective values in the main absorption unit. This can also be achieved by resetting the shut-off devices (ball valves, stopcocks, or slides).

Other objects, advantages and applications of the present invention will become apparent to those skilled in the art of filter bypass measuring sections when the accompanying description of several examples of the best mode contemplated for practicing the invention are read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is an end elevational view of a main absorption unit;

FIG. 2 is a side elevational view of the main absorption unit illustrated in FIG. 1;

FIG. 3 is an enlarged, fragmentary view of FIG. 2;

FIG. 4 is a fragmentary, top plan view of FIG. 2;

FIG. 9 is an enlarged, partially sectioned view of the bypass section illustrated in FIG. 5 of the drawings;

FIG. 10 is a side elevational view of FIG. 9;

FIG. 11 is an enlarged, longitudinal, cross-sectional view of the bypass element illustrated in FIG. 5 of the drawings;

FIG. 12 is a cross-sectional view of FIG. 11; and

FIG. 13 is an enlarged, fragmentary view of FIG. 11.

DESCRIPTION OF THE PREFERRED EMBODIMENT

Figure 5:
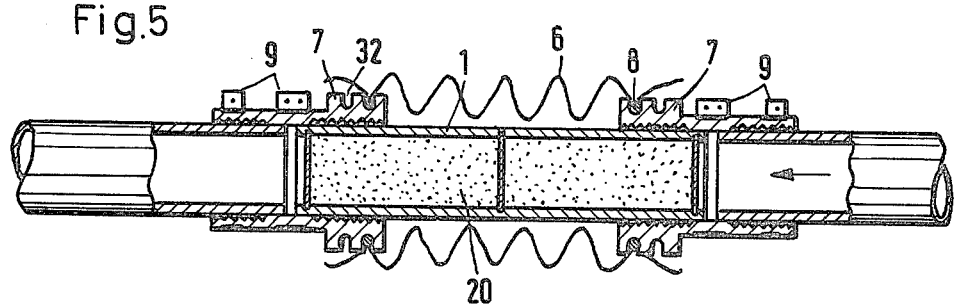
FIG. 5 is an enlarged, fragmentary, partially sectioned view of a bypass section illustrated in FIG. 2 of the drawings.

The following description makes reference to the accompanying drawings wherein like reference numbers refer to like components throughout the several views.

According to the drawings, the bypass measurement section is arranged parallel to the main absorption unit, which is familiar to the art and shown in FIGS. 1 and 2.

FIG. 3 shows the novel bypass measurement section design in detail. Supply pipe 2, leading to filtration cartridge 1, contains a manually or automatically actuated damping device 3. In the direction of flow the following devices follow in sequence: a familiar shut-off device 31 (such as a turnable valve or a power actuated ball valve or stopcock), the grooved sleeve joint 7 on supply pipe 2, to which the measurement cartridge 1 is connected, containing the filtering layer 4, then the protective maintenance sleeve or tube 6, followed again by the grooved sleeve joint 7; effluent pipe 11, which contains the measuring instrument 5, which via conduit 16 is linked to the automatic damping device 17, finally followed by the shut-off device 31, which can also be electrically or magnetically actuable.

FIG. 4 provides a fragmentary top view of FIG. 3. Parts 5 and 3 have been represented also, for the case that the main connection also has to be controllable by means of an anemometer and a damping device.

FIGS. 5, 6, 7 and 8 show the sequence of maintenance steps involved in exchanging a cartridge in the measurement section, together with the sealing points 21 and 22 on the protective tubing sleeve 6.

FIG. 5 demonstrates the situation and location of the filter cartridge in the measurement section, installed as bypass and ready for service with absorption material 20. The protection tube 6 is installed by a gas tight compression coupling 8.

Figure 6:
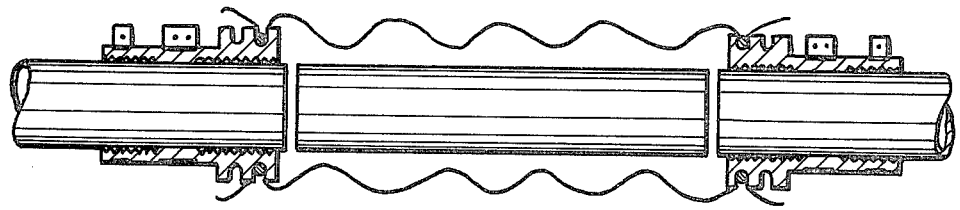
FIGS. 6, 7 and 8 show the sequence in removing a cartridge from the bypass section illustrated in FIG. 5 of the drawings.

FIG. 6 shows the grooved sleeve joints 7, bilaterally pulled apart and freed of clamp couplings 9, in between is the slightly stretched protective tubing 6, but still held in gas-tight fashion by rings or couplings 8 in the grooves 32 of the grooved sleeve joint 7.

Figure 7:
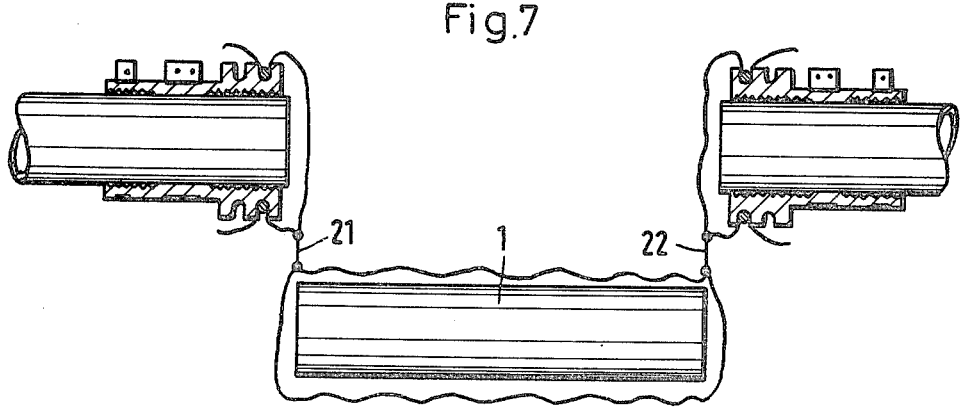

FIG. 7 shows how cartridge 1, contained in protective tubing 6, has been laterally displaced and sealed on both ends at the two welding locations 21 and 22.

Figure 8:
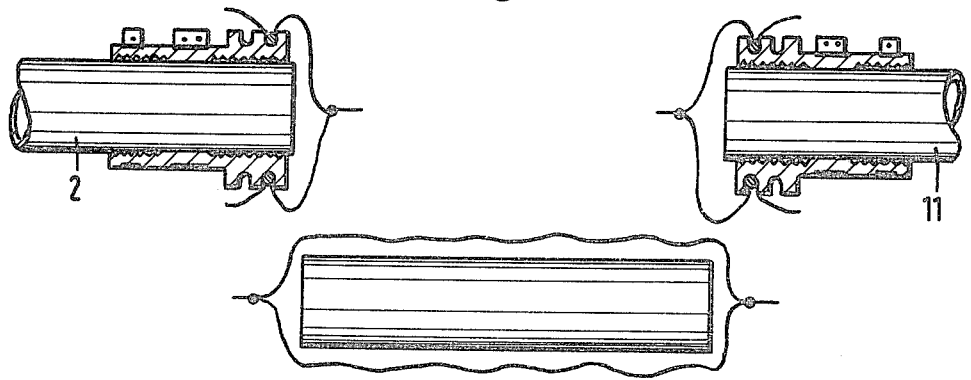

FIG. 8 shows how protective tubing 6 can be cut between the welding points 21 and 22, whereby not only measurement cartridge 1, but also the feed- and off-gas sections 2 and 11 are hermetically sealed and remain individually closed off.

FIGS. 9 and 10 provide for more representative detail, in large scale, of items already previously described.

By way of a further variation, FIG. 9 shows, apart from clamp coupling 9, a further safety clamp 35 in notch 34, both being used to secure the grooved sleeve coupling 7.

FIG. 10 shows a familiar clamp coupling 35 in cross-section, with tightening screw 36, used to enclose grooved sleeve coupling 7 and to provide a tight seal on pipe segments 11 or 2.

FIG. 11 is a more detailed drawing of the bypass measurement section, showing the subdivided chamber systems 18, which are held in place by perforated screens 28, secured in turn bilaterally in slots 30 by means of internal Seeger-rings 29. The grooved sleeve joints 7 are shown in cross-sectional view; they consist of elastic plastic material or rubber and feature internal grooving 23. They are closed off in the middle by a seal 24 and are held securely by clamp connectors 9 (or respectively 35, see FIG. 9) on the feed and effluent pipe sections 2 and 11. The filling or discharge adaptors 19, in straight or slanted arrangement, are provided for emptying or recharging the separate chambers 18 with the absorption material 20. Rings 8, in the two grooves 32 of the grooved sleeve joint 7, serve in familiar fashion for gas-tight sealing of the maintenance sleeve 6 and for changing from a used to a new maintenance sleeve 6. Furthermore, FIG. 11 demonstrates the recess 33 on sleeve joint 7 which accepts clamp coupling 9. The volume provided for absorbent material is given by 13.

FIG. 12 details the internal Seeger-rings 29 in top view; the drawing shows these rings as installed for holding in place the perforated screen 28 inside measurement cartridge 1.

FIG. 13 is a cross-section enlargement of the bypass filter cartridge cross section 1 with grooves or slots 30 in which the Seeger-rings bilaterally hold the perforated screens in place.

The devices, and their functional arrangement as described for the novel bypass measurement section, demonstrate a series of novel interconnected solutions which were heretofore not known in nuclear technology. The solutions provided serve to meet the safety requirements of nuclear facilities in a much better manner. This not only pertains to the monitoring system with respect to airflow velocity in the bypass section in relation to air-flow controls on the main filtration unit, but also has reference to the more advantageous design of a multichambered filter cartridge in triplet form, with the functionally arranged individual charge or discharge adaptors.

In addition, exchange of test cartridges without contamination, as well as transportation of the removed cartridges, is solved in a trouble-free fashion by means of the protective tubing isolation, as demonstrated. The test cartridges are sealed in the tubing prior to removal. The feed and off-gas connection pipes to the bypass measurement section are hermetically sealed by tubing caps until a new cartridge is installed; no contamination is possible.

The reduced layer thickness of the test cartridges in the measurement sections, vs. the layer thickness of the main filtration units to be monitored, has not been shown in the figures. It has been found advantageous to reduce the layer thickness of the test cartridge by up to 30% in comparison with the main absorption filters. This allows adequate adjustment of the flow velocities in both systems by means of controls. The instrument, built into the test cartridge pipeline for measuring flow-through velocity, can be activated by familiar means, e.g. ultrasound or light impulses, the automatic feedback controls for air supply regulation.

The technical progress of this novel, coordinated, design in a further sense consists in addition of the possibility that the multichamber system of the test cartridge, with its separate discharge and refill adaptors, provides for sectional removal of the absorbent into a pouch to determine the degree of saturation, without having to disassemble the whole or part of the bypass measurement section.

Based on this feature, a recharge of the cartridge chamber with charcoal is at any time possible, without the time consuming disassembly step.

The discharge openings of the cartridge chambers are of great importance for adapting the test absorbent layer to the absorbent layer of the main filtration unit.

While several examples of applicants' invention are disclosed, it should be understood by those skilled in the art of filters that other forms of applicants' invention may be had, all coming within the spirit of the invention and scope of the appended claims.

What is claimed is as follows:

1. In an absorption filter of the type for purifying gases, and wherein the absorption filter has an inlet for the gas to be purified, and an outlet and an absorbent layer therebetween, the improvement comprising a bypass measurement section comprising:

a tubular section having a removable absorbent layer, which is a proportional amount of the absorbent layer within the absorption filter, said tubular section having a first pipe connected to a supply pipe which is connected to said filter inlet and a second pipe connected to a discharge pipe communicating with said filter outlet, said removable absorbent layer being disposed between said first pipe and said second pipe;

dampening means in said first pipe for controlling the flow of said gas into said tubular section;

control means connected to and actuating said dampening means;

sensing means in said second pipe for sensing the flow rate through said tubular section, said sensing means connected to and actuating said control means to control said dampening means such that the flow of gas through said tubular section is a function of the rate of flow in said absorption filter;

first and second shut-off valve means connected to said first pipe and said second pipe respectively located ahead of and beyond said removable absorbent layer for closing communication between said absorbent layer and said tubular section inlet and outlet for facilitating the removal of said absorbent layer from said tubular section;

a pair of gas-tight, axially displaceable coupling members securing said absorbent layer to said tubular section and facilitating the removal of said absorbent layer therefrom; and a protective sleeve connected to said coupling members and enclosing said absorbent layer.

2. The absorption filter defined in claim 1 wherein said dampening means is positioned in said first pipe and said filter further comprises an air flow measurement instrument connected to said second pipe and said control means.

3. The absorption filter defined in claim 1 wherein said tubular section and said removable absorbent layer is subdivided into several chambers, each of said several chambers being individually provided with separate screw-capped discharge nipples for the absorbent.

4. The absorption filter defined in claim 3 further comprising a plurality of installed, perforated, screened disks installed in the chamber surrounding said removable absorbent layer for forming said subdivision chambers, said disks being held in place by internally serviceable seeger-ring grooves formed in said tubular section.

5. The absorption filter defined in claim 1 wherein the axially displaceable coupling members are each fabricated from a plastic material and are internally grooved, each of said grooves being filled by an elastic material forming a seal.

6. The absorption filter defined in claim 5 wherein said axially displaceable coupling members are provided with border notches.

7. The absorption filter defined in claim 5 wherein the tubular section has an exterior diameter corresponding approximately to the exterior diameter of the axially displaceable coupling members.

8. The absorption filter defined in claim 1 wherein said filter comprises three of said bypass measurement sections which are mounted as a triplet set, one next to each other, between a pair of upper and lower cross-headers defining said supply and discharge pipes respectively, each of said bypass sections having a first pipe connected to the upper cross-header said upper header communicating with said absorption filter inlet and each of said bypass sections having a second pipe connected to the lower cross-header, said lower header communicating with said absorption filter outlet.

* * * * *